(12) United States Patent
Helvey et al.

(10) Patent No.: US 6,976,810 B2
(45) Date of Patent: Dec. 20, 2005

(54) ROTATABLE CUTTING WHEEL

(75) Inventors: Amy M. Helvey, Imperial, MO (US);
Matthew Davies, Charlotte, NC (US);
Karl Martin, Akron, OH (US); Brian Dutterer, Taneytown, MD (US)

(73) Assignee: The Boeing Company, Seattle, WA (US)

( * ) Notice: Subject to any disclaimer, the term of this patent is extended or adjusted under 35 U.S.C. 154(b) by 159 days.

(21) Appl. No.: 10/199,860

(22) Filed: Jul. 19, 2002

(65) Prior Publication Data

US 2004/0013477 A1 Jan. 22, 2004

(51) Int. Cl.[7] ............................................. B23C 5/12
(52) U.S. Cl. ............................ 407/30; 407/53; 407/56
(58) Field of Search ...................... 407/30, 53, 56, 407/61, 62, 118, 119; 408/144, 203.5, 227, 408/229; 144/240, 241; 83/835, 839, 840, 83/841, 842, 843, 844, 845, 676

(56) References Cited

U.S. PATENT DOCUMENTS

| | | | |
|---|---|---|---|
| 56,058 A * | 7/1866 | Jennings .................... 407/61 |
| 551,063 A * | 12/1895 | Tyler ........................ 407/30 |
| 822,591 A * | 6/1906 | Dowding ................... 407/48 |
| 1,354,097 A * | 9/1920 | Fitzsimmons .............. 407/53 |
| 2,912,904 A * | 11/1959 | Peterson ................... 409/234 |
| 4,040,765 A * | 8/1977 | Vig ........................ 408/239 A |
| 4,086,733 A * | 5/1978 | Vig ............................ 408/230 |
| 4,530,264 A | 7/1985 | Felstehausen |
| 4,789,277 A * | 12/1988 | Rhodes et al. .............. 409/131 |
| 4,874,001 A * | 10/1989 | Ferraris ..................... 407/56 |
| 4,906,145 A | 3/1990 | Oliver |
| 4,988,241 A * | 1/1991 | Colligan ..................... 407/51 |
| 5,100,267 A * | 3/1992 | Salyer ........................ 407/54 |
| 5,135,035 A | 8/1992 | Mills |
| 5,250,367 A * | 10/1993 | Santhanam et al. ......... 428/698 |
| 5,259,428 A * | 11/1993 | Matthews ................... 83/836 |
| 5,393,174 A | 2/1995 | Wawrzyniak |
| 5,557,848 A | 9/1996 | Povey |
| 5,657,803 A | 8/1997 | Kappel et al. |
| 5,678,966 A | 10/1997 | Heimann |
| 5,704,735 A | 1/1998 | Moreau |
| 5,788,426 A * | 8/1998 | Daniels ....................... 407/36 |
| 5,810,517 A * | 9/1998 | Bostic ........................ 340/53 |
| 5,865,085 A | 2/1999 | Vollenweider |
| 6,053,264 A | 4/2000 | Frankel et al. |
| 6,183,173 B1 * | 2/2001 | Ritter ......................... 408/59 |
| 6,431,799 B1 | 8/2002 | Francis et al. |
| 6,508,612 B1 * | 1/2003 | Baca .......................... 407/43 |
| 6,585,459 B2 * | 7/2003 | Wirth et al. ............. 408/203.5 |

* cited by examiner

Primary Examiner—Boyer D. Ashley
Assistant Examiner—Dana Ross
(74) Attorney, Agent, or Firm—Alston & Bird LLP

(57) ABSTRACT

A rotatable cutter wheel for machining structural members is provided. The cutter wheel includes a disk, typically formed of carbide, defining a first side, a second side opposite to the first side, and a plurality of radial blades. At least one of the first and second sides defines a dished or concave surface.

37 Claims, 8 Drawing Sheets

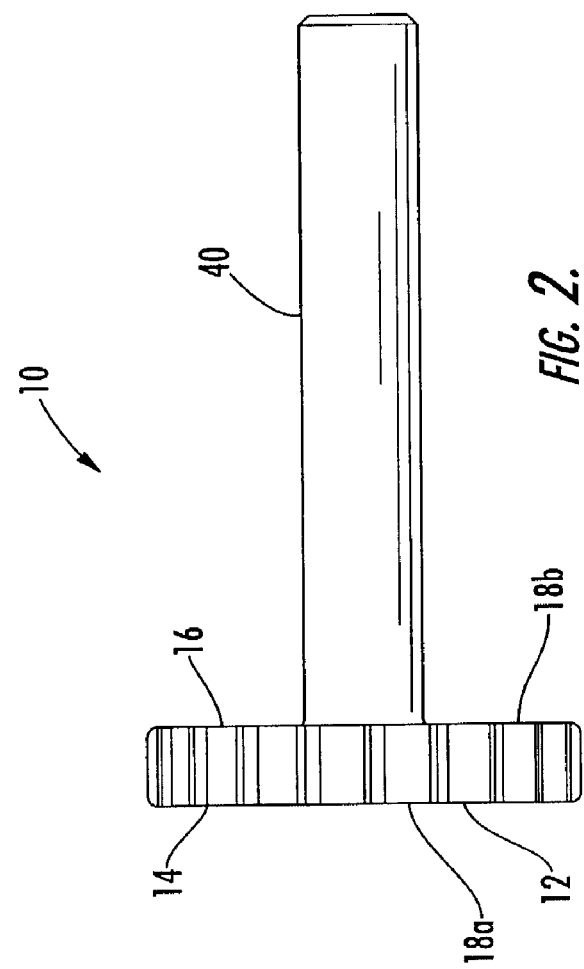
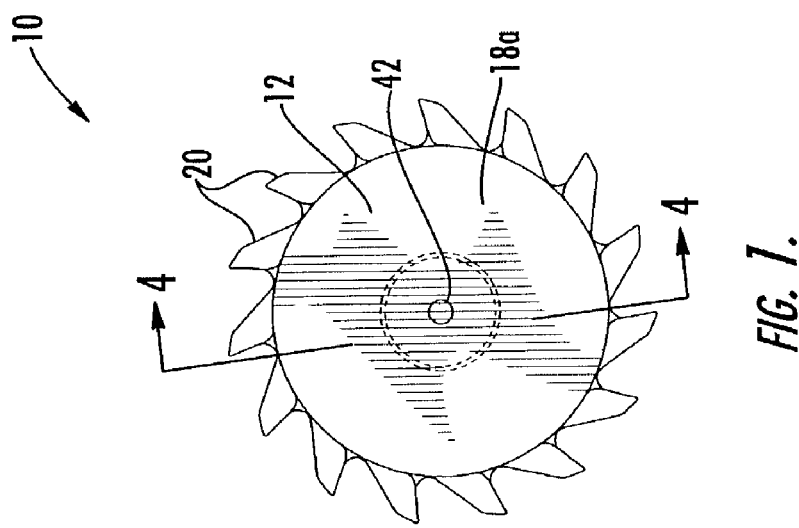

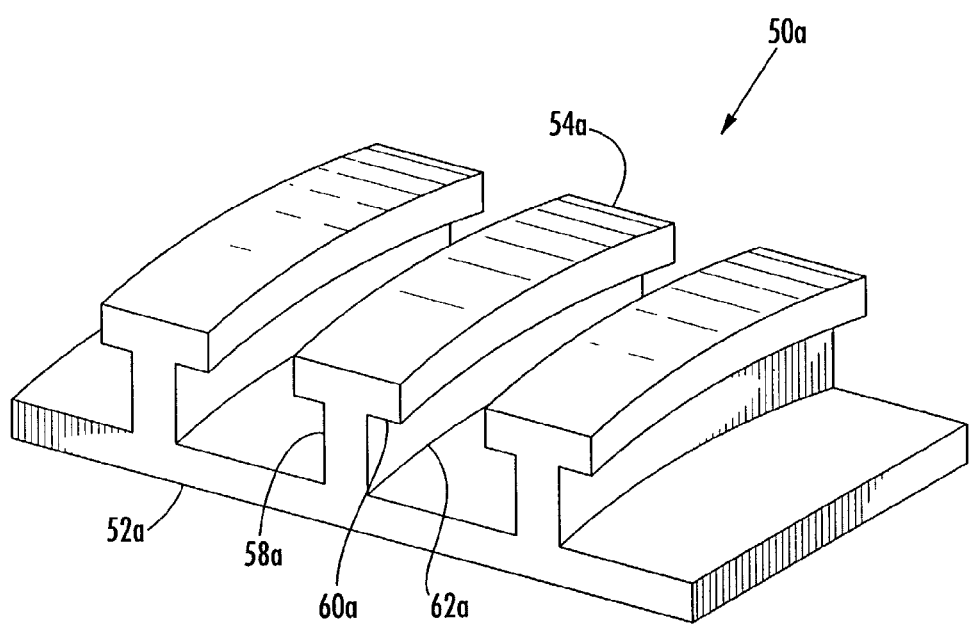
FIG. 6.
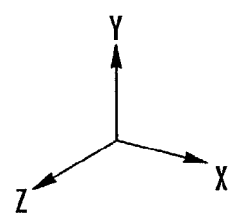

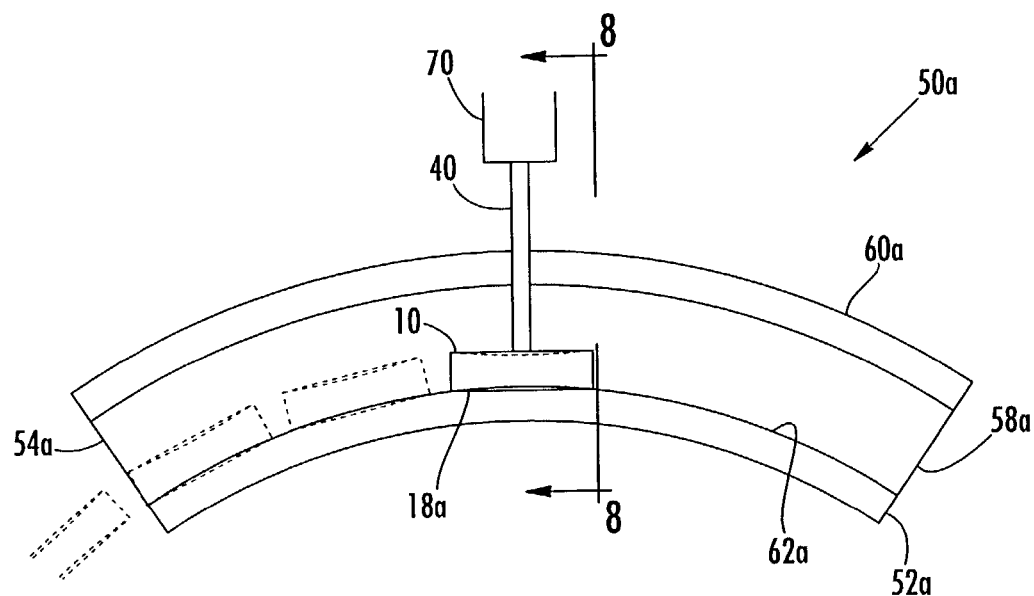
FIG. 7.
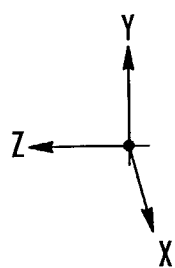

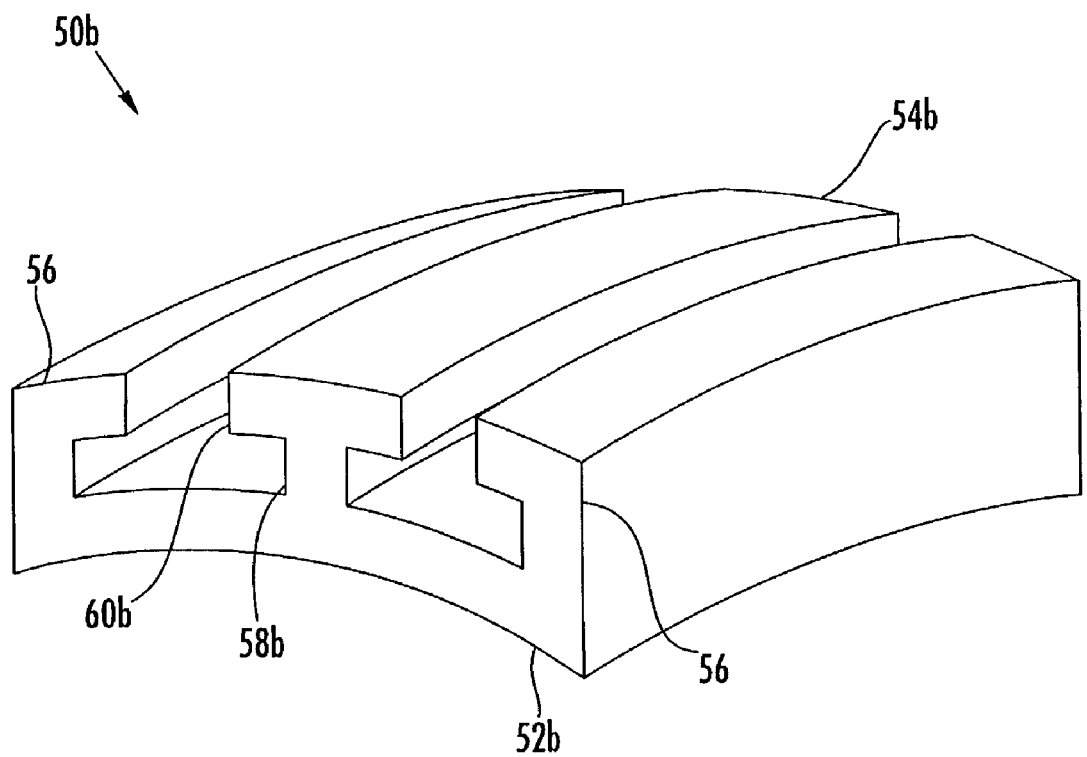
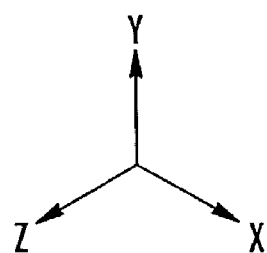
FIG. 9.

ROTATABLE CUTTING WHEEL

BACKGROUND OF THE INVENTION

1) Field of the Invention

This invention relates to the formation of structural members and, more particularly, relates to cutter wheels for machining structural members.

2) Description of Related Art

Cutter wheels are well known for machining structural members to specific configurations. A cutter wheel is generally a disk-shaped wheel with blades that extend in an outwardly radial direction. The blades may be formed as a unitary part of the disk-shaped wheel or may be removable inserts that are secured within spaces in the wheel by set screws or other attachment devices. The wheel is typically formed of steel, and, if removable blade inserts are used, the blade inserts can be formed of a variety of materials such as high speed steel or carbide. A shaft connects the cutter wheel to a rotational device such as an electric motor so that the cutter wheel is rotated about a central rotational axis. In operation, the rotating cutter wheel is brought into contact with a workpiece so that the blades remove material from the workpiece to achieve the desired shape of the structural member.

Because of the configuration of the cutter wheel and rotational device, some complex structural members are difficult to form. An example of such a complex structural member 50 is shown in FIG. 5. The structural member 50 includes T-shaped stiffeners 54 ("T-stiffeners") that extend from a base portion 52. Webs 58 of the T-stiffeners 54 extend perpendicular to the base portion 52, and flanges 60 of the T-stiffeners 54 extend parallel to the base portion 52 from ends of the webs 58 distal to the base portion 52. The flanges 60 of adjacent T-stiffeners 54 are located so closely to one another that the rotational device 70 cannot be positioned between the T-stiffeners 54. It is possible, however, to position the rotational device 70 opposite the flanges 60 from the base portion 52 such that a shaft 140 extends from the rotational device 70 to a cutter wheel 100 between the T-stiffeners 54, as shown in FIG. 5. The rotational axis of the cutter wheel 100 is typically perpendicular to the base portion 52 of the structural member 50.

In this orientation, inadvertent contact can occur between the cutter wheel 100 and the structural member 50. For example, when machining the base portion 52 of the structural member 50, the central disk-shaped portion 112 of the cutter wheel 100 is pressed against the base portion 52 and translated along the length of the base portion 52. The central portion 112 rubs against the base portion 52, and this rubbing can generate significant frictional heat that can deform, mar, or otherwise damage the surface of the base portion 52 and the cutter wheel 100. Further, material parts can become caught between the central portion 112 of the cutter wheel 100 and the base portion 52. The material parts can scratch the base portion 52 and, in some cases, the frictional heat can cause the material parts to be welded to the structural member 50 resulting in unwanted build-up on the structural member 50. Cooling fluid can be used to reduce the friction between the cutter wheel 100 and the structural member 50, but the cooling fluid is prevented from flowing between the cutter wheel 50 and the base portion 52, for example, when the central portion 112 is pressed against the base portion 52.

Further, the geometry of some structural members prevents their formation using a conventional cutter wheel. For example, the structural member 50a shown in FIG. 6 includes a curved base portion 52a with T-stiffeners 54a extending therefrom. A cutter wheel 100 can be positioned between the T-stiffeners 54a by extending the shaft 140 between the T-stiffeners 54a as described above, but the rubbing problems described above are more severe due to the curvature of the base portion 52a. Further, in order to follow the curvature of the base portion 52a, the cutter wheel 100 must be rotated against the base portion 52a as the cutter wheel 100 is translated along the base portion 52a, but such rotation is prevented by the contact that results between the curved base portion 52a and the central portion 112 of the cutter wheel. Thus, a conventional cutter wheel 100 configured in that manner cannot properly machine all the sections of the structural member 50a.

One proposed solution for forming such complex structural members is to mount the cutter wheel on a right-angle head. The right-angle head transmits the torque from the shaft to the cutter wheel and engages the shaft and the cutter wheel such that the cutter wheel rotates about an axis that is perpendicular to the axis of the shaft. Depending on the geometry of a particular structural member, some cutter wheels can be used with the right-angle head to machine complex structural members similar to the one shown in FIG. 6. The right-angle head, however, adds to the tooling cost for the machining process. Additionally, the use of the right-angle head can complicate the machining process. For example, if some of the machining of a structural member is done with the right-angle head and some is done without, the machining process must be stopped so that the right-angle head can be mounted or dismounted from the rotational device and the cutter wheel. Thus, the use of a right-angle head increases the time and cost of manufacture and the likelihood of errors during manufacture.

Alternatively, complex structural members of the type shown in FIGS. 5 and 6 can also be manufactured by forming the T-stiffeners separate from the base portion, machining the T-stiffeners and base portion to the required dimensions separately, and thereafter joining the T-stiffeners to the base portion. The base portion and the T-stiffeners individually can be machined using a conventional wheel cutter without the use of a right-angle head. However, joining the T-stiffeners to the base portion requires the use of a joining method such as welding, riveting, screwing, bolting, clipping, or the like. This adds a step to the manufacturing process, thereby increasing the time and cost of manufacture for the structural member. Additionally, the resulting joint may weaken and/or add weight to the structural member.

Thus, there exists a need for an improved cutter wheel that addresses the foregoing issues. Particularly, the cutter wheel should be capable of machining a variety of structural members including, but not limited to, structural members that have a curved base portion with webs and flanges extending therefrom. The cutter wheel advantageously should not require the use of a right-angle head or other special device for connecting the cutter wheel to the rotational device. Additionally, the cutter wheel should be capable of high speed machining to minimize the time required for machining the structural member without presenting a significant risk to nearby personnel or equipment.

BRIEF SUMMARY OF THE INVENTION

The present invention provides a rotatable cutter wheel that can machine at high speeds. The cutter wheel includes a disk that defines a first side, a second side opposite to the first side, and a plurality of radial blades. According to one aspect of the present invention, the blades and disk comprise a unitary member. The cutter wheel can also include a shank that extends from at least one of the sides. The shank can comprise carbide and can be part of a unitary member with the disk.

At least one of the first and second sides defines a concave surface, and both sides can define concave surfaces. According to one aspect of the invention, the concave surface extends between a minimum axial dimension and a maximum axial dimension, and the maximum axial dimension is at least 0.05 inches greater axially than the minimum axial dimension. The maximum axial dimension can be defined by the plurality of blades. The concave surfaces can define a smooth surface extending radially inward from the blades, and, in one embodiment, at least a part of the concave surface defines a spherically-curved contour.

According to another aspect of the invention, each of the blades defines a leading side, a trailing side, and a relief side extending at least partially therebetween. Each of the blades can extend radially from the disk and define a cutting edge that extends radially and axially. Each of the blades can define a first side edge on the first side of the disk, a second side edge on the second side of the disk, and a top edge extending between the first and second side edges such that the cutting wheel is capable of machining a workpiece when the cutting wheel is rotated and one of the first and second sides of the disk is urged against the workpiece. In addition, the disk can define a plurality of radially fluted lands between the blades. The disk can also define an alignment aperture located at a rotational center of the disk.

According to yet another aspect of the present invention, the disk comprises carbide, for example, cemented carbide. The cemented carbide can comprise tungsten carbide and cobalt binder. The carbide can also include titanium carbide, titanium carbonitride, tantalum carbide, niobium carbide, or chromium carbide. In addition, the disk can include a coating including aluminum oxide, titanium nitride, titanium aluminum nitride, titanium carbonitride, zirconium nitride, or chromium. According to one aspect, the carbide has a hardness of at least 84 Rockwell.

The present invention also provides a rotatable cutting wheel comprising a carbide disk that defines a first side, a second side opposite to the first side, and a plurality of radial blades. At least one of the first and second sides defines a smooth, concave surface that extends radially inward from a maximum axial dimension defined by the blades to a minimum axial dimension. According to one aspect, the maximum axial dimension is at least about 0.05 inches greater in an axial direction than the minimum axial dimension. Each of the first and second sides can define a smooth, concave surface, and, according to one aspect of the invention, at least a part of the smooth, concave surface defines a spherically-curved contour. The cutter wheel can also include a shank that extends from at least one of the sides. The disk and the blades can comprise a unitary member, and the shank can comprise a unitary carbide member with the disk.

According to one aspect of the invention, each of the blades defines a leading side, a trailing side, and a relief side extending at least partially therebetween. Each of the blades can extend radially from the disk and define a cutting edge that extends radially and axially. Each of the blades can define a first side edge on the first side of the disk, a second side edge on the second side of the disk, and a top edge extending between the first and second side edges such that the cutting wheel is capable of machining a workpiece when the cutting wheel is rotated and one of the first and second sides of the disk is urged against the workpiece. In addition, the disk can define a plurality of radially fluted lands between the blades. The disk can also define an alignment aperture located at a rotational center of the disk.

According to another aspect of the present invention, the disk comprises cemented carbide. The cemented carbide can comprise tungsten carbide and cobalt binder. The carbide can also include titanium carbide, titanium carbonitride, tantalum carbide, niobium carbide, or chromium carbide. In addition, the disk can include a coating of aluminum oxide, titanium nitride, titanium aluminum nitride, titanium carbonitride, zirconium nitride, or chromium. According to one aspect, the carbide has a hardness of at least 84 Rockwell.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 1 is an elevation view of a cutter wheel according to one embodiment of the present invention;

FIG. 2 is an orthogonal right side view of the cutter wheel of FIG. 1;

FIG. 6 is a perspective view of a structural member formed with a cutter wheel according to one embodiment of the present invention;

FIG. 7 is a partial view of the structural member of FIG. 6 during manufacture;

FIG. 9 is a perspective view of a structural member formed with a cutter wheel according to one embodiment of the present invention.

DETAILED DESCRIPTION OF THE INVENTION

Figure 4:
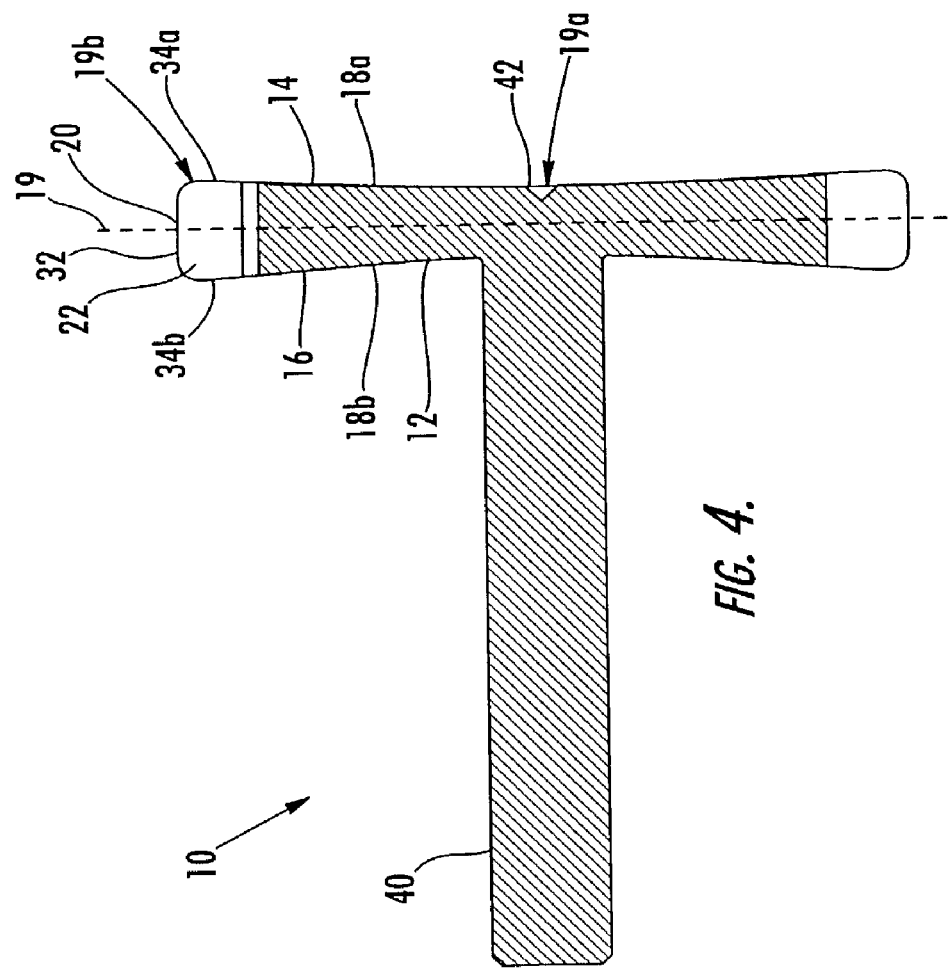
FIG. 4 is a section view of the cutter wheel of FIG. 1 as seen from line 4—4 of FIG. 1.

The present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Turning now to the figures, and specifically to FIG. 1, there is shown a rotatable cutter wheel 10 according to one embodiment of the present invention. The cutter wheel 10 generally includes a central portion 12, a plurality of blades 20 extending radially from the central portion 12, and a shaft 40 extending axially from the central portion 12 to define the rotational axis of the cutter wheel 10.

The central portion 12 and the blades 20 of the cutter wheel 10 can be formed of a variety of materials including steel, titanium, carbide, or alloys thereof. According to one advantageous embodiment of the present invention, the cutter wheel 10 is formed of carbide according to known methods of producing carbide tools. For example, the carbide cutter wheel 10 can be produced by first forming a carbide blank and then machining the cutter wheel 10 from the blank. Alternatively, the cutter wheel 10 can be formed in its finished shape from cemented carbide according to powder metallurgical techniques. For example, according to one typical process for manufacturing carbide tools, powders of tungsten carbide and cobalt binder are blended, compacted, and sintered at about 1250° C. to 1500° C. Other materials can be added to the mixture such as titanium carbide, titanium carbonitride, tantalum carbide, niobium carbide, chromium carbide, and the like. Additionally, the cobalt binder can be substituted or supplemented with other binder materials such as iron, nickel, and molybdenum. Cutter wheels 10 formed of cemented carbide can be ground or honed after the sintering process to achieve close tolerances. As shown in FIG. 1, the cutter wheel 10 includes an alignment aperture 42 that can be used to align the cutter wheel 10 during the honing process. In the illustrated embodiment, the alignment aperture 42 is located at a rotational center of the cutter wheel 10, i.e., collinear with the rotational axis of the shaft 40. The cutter wheel 10 can be supported by the alignment aperture 42 as well as the shaft 40 while being honed. In addition, the alignment aperture 42 can be used to align the cutter wheel 10 to rehone the cutter wheel 10 after the cutter wheel 10 has been used, for example, in order to sharpen the blades 20 or remove defects from the outer surface of the cutter wheel 10.

Carbide tools generally exhibit high hardness, stiffness, and wear resistance. Typical hardness values for carbides range from about 84 to 94 Rockwell, though some carbides are harder or softer. The mechanical properties of the carbide cutting wheel 10 can be enhanced by applying a coating to the tool, for example, by chemical vapor deposition or physical vapor deposition as is known by those of ordinary skill in the art. Coatings include aluminum oxide coatings, titanium nitride, titanium aluminum nitride, titanium carbonitride, zirconium nitride, and chromium coatings. Due to the favorable mechanical properties, the cutting wheel 10 can be rotated at high speeds for machining a variety of metals including, but not limited to, aluminum, titanium, steel, other metals, and alloys thereof. The cutting wheel 10 can also be used to machine non-metal materials such as plastic and rubber.

The cutter wheel 10 is preferably formed of a single or unitary piece of carbide so that the blades 20 are not removable from the central portion 12. Forming the cutter wheel 10 as a single piece reduces the likelihood of failure that can occur with conventional cutter wheels that include removable parts such as blade inserts. Removable parts can be installed incorrectly, for example, by improperly orienting the removable parts relative to the wheel or improperly attaching the removable parts to the wheel. Incorrect removable parts can also be installed mistakenly. Additionally, even if properly assembled, a cutter wheel with removable parts generally has weak regions where the removable parts are attached to the cutter wheel. Such weak regions increase the likelihood of failure and, thus, the danger to nearby personnel and equipment. For example, a cutter with a removable blade typically defines a weak region at a point of attachment of the blade. The weak region is subject to failure, in which case the blade could be projected from the blade and harm a person or machine near the blade. Nevertheless, the blades 20 could be removable in other embodiments of the present invention.

The shaft 40 can also be formed of carbide and can be formed as a unitary part of the cutter wheel 10 so that the shaft, central portion 10, and blades 20 form a single or unitary structure. For example, the cutter wheel 10 can be formed by machining the shaft 40, central portion 12, and blades 20 from a single piece of carbide or by cementing grains of carbide material to form the cutter wheel 10. As described above, the grains can be cemented to form a carbide blank that is then shaped or machined to form the cutter wheel 10, or the grains can be compressed and sintered in the shape of the cutter wheel 10. Alternatively, the shaft 40 can be formed separate from the central portion 12, in which case the shaft 40 may comprise, for example, carbide, steel, or other tool materials as are known in the art. If the shaft 40 is formed separate from the central portion 12, the shaft 40 may be attached to the central portion 12 by any known connection method such as welding or bolting the shaft 40 to the central portion 12.

Figure 3:
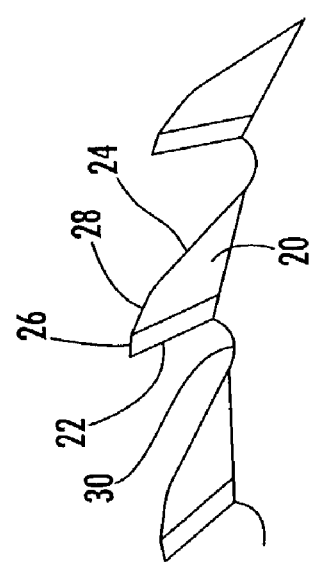
FIG. 3 is a detail view of the blades of the cutter wheel of FIG. 1.

As shown in FIGS. 1 and 2, each of the blades 20 extends outward in a radial direction from the central portion 12 of the cutter wheel 10. In other embodiments, the blades 20 can also extend axially out of the plane of the central portion 12. Consecutive blades 20 are separated by lands 30, which are portions of the cutter wheel 10 that do not extend as far radially as the blades 20. Preferably, the lands 30 are fluted radially to define a smooth transition between the blades 20, thereby reducing the likelihood of high stress concentrations developing proximate to the blades 20. As shown in FIG. 3, each of the blades 20 defines a leading surface 22 and a trailing surface 24. The cutter wheel 10 is preferably rotated so that the leading surface 22 is a working surface that contacts a workpiece such as the structural member 50 and machines the surfaces of the workpiece. The leading and trailing surfaces 22, 24 can be angled relative to a radial direction of the cutter wheel 10 as is known in the art. A top surface 26 and a relief surface 28 generally connect the leading surface 22 and the trailing surface 24. The top surface 26 may be parallel to a tangent of the central portion 12 of the cutter wheel 10 or angled relative to the tangent. In one advantageous embodiment shown in FIG. 3, the relief surface 28 of each blade 22 is angled more steeply relative to the tangent than the top surface 26. As shown in FIG. 4, the leading surface 22 of each blade 20 defines a top edge 32 proximate to the top surface 26 and side edges 34a, 34b to define a continuous cutting edge that extends both radially and axially. Thus, each of the top and side edges 32, 34a, 34b can be used to machine the workpiece by advancing the cutting wheel 10 in an axial or radial direction against the workpiece.

The central portion 12 of the cutter wheel 10 is generally disk shaped and defines a first side 14 and an opposed second side 16. Each of the first and second sides 14, 16 of the illustrated embodiment defines a dished or concave surface 18a, 18b, though in other embodiments only one of the first and second sides 14, 16 defines a dished surface. Each of the dished surfaces 18a, 18b defines a minimum axial dimension 19a, which is the section of the dished surface 18a, 18b that is separated axially by the shortest distance from a reference plane 19 perpendicular to the rotational axis of the cutter wheel 10 and positioned intermediate of or between the first and second sides 14, 16. Each dished surface 18a, 18b also defines a maximum axial dimension 19b, which is the section of the dished surface 18a, 18b that is separated axially by the longest distance from the reference plane 19. As shown in FIG. 4, the maximum axial dimension 19b can occur at the blades 20, and the minimum axial dimension 19a can occur along the rotational axis. In the case of a cutter wheel 10 with symmetrical dished surfaces 18*a*, 18*b*, as shown in FIG. 4, the minimum and maximum axial dimensions 19*a*, 19*b* occur at the same radial location on the first and second sides 14, 16 of the cutter wheel 10 and at the sections where the cutter wheel 10 is thinnest and thickest axially. The maximum axial dimension 19*b* of each dished surface 18*a*, 18*b* of the cutter wheel 10 shown in FIG. 4 is at least 0.05 inches greater than the minimum axial dimension 19*a*, i.e., the concave dished surface has an axial depth of at least 0.05 inches. Preferably, each of the dished surfaces 18*a*, 18*b* of the cutter wheel 10 defines a smooth surface that extends radially inward from the blades 20, for example, to the shaft 40 or the rotational axis of the cutter wheel 10. In one advantageous embodiment of the present invention, at least part of the dished surfaces 18*a*, 18*b* define spherically-curved contours. For example, the dished surfaces 18*a*, 18*b* shown in FIG. 4 define shapes of partial spheres. The dished surfaces 18*a*, 18*b* allow the sides 14, 16 of the cutter wheel 10 to be brought into proximity with the workpiece during machining of the workpiece without contacting the central portion 12 of the cutter wheel 10 with the workpiece as described below. In other embodiments, the dished surfaces 18*a*, 18*b* define parabolic or other contours such as curved surfaces defined by multiple-order polynomial equations.

Figure 5:
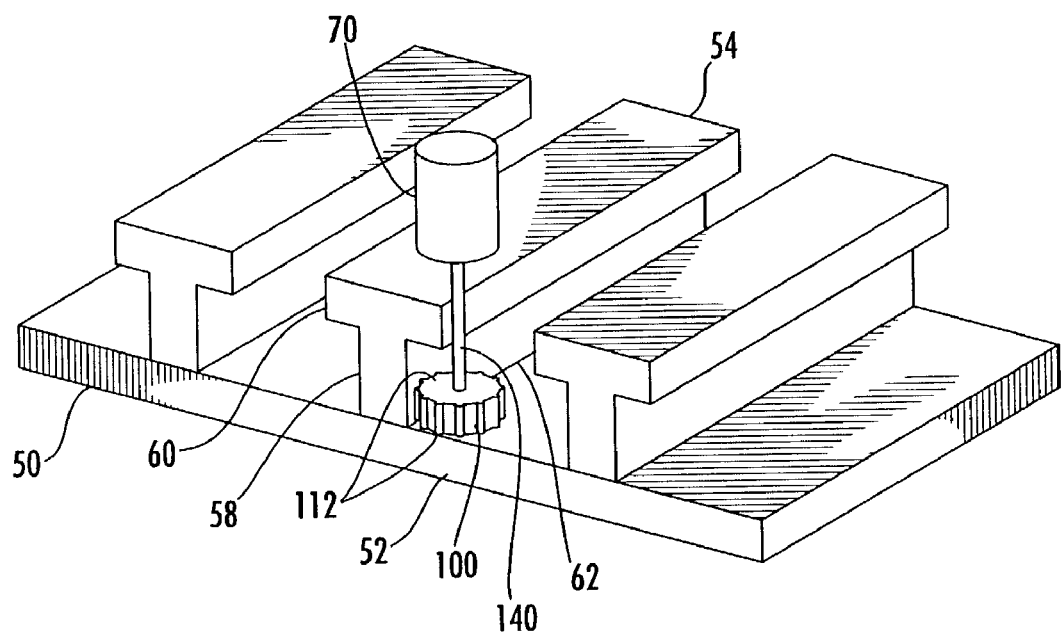
FIG. 5 is a perspective view of a structural member formed with a cutter wheel according to the prior art.

The cutter wheel 10 can be used to machine structural members 50 such as the one shown in FIG. 5. The cutter wheel 10 can be oriented similar to the orientation of the conventional cutter wheel 100 shown in FIG. 5 so that the cutter wheel 10 is located between the T-stiffeners 54 of the structural member 50. According to one aspect of the present invention, the cutter wheel 10 is translated along the structural member 50 so that the top and/or side edges 32, 34*a*, 34*b* of the blades 20 contact and remove material from the structural member 50. When one of the sides 14, 16 is positioned proximate to the structural member 50, the dished surfaces 18*a*, 18*b* provide a space between the cutter wheel 10 and the structural member 50 and prevent the central portion 12 of the cutter wheel 10 from contacting the structural member 50. Advantageously, the dished surfaces 18*a*, 18*b* thereby reduce the frictional heat that is otherwise generated between the central portion 12 of the cutter wheel 10 and the structural member 50. If small pieces of debris, such as pieces of structural material that are removed from the structural member 50, are swept between the central portion 12 and the structural member 50, the space therebetween defined by the dished surface 18*a*, 18*b* allows the structural materials to move without being pressed against the structural member 50 until discharged from the space. When a cooling fluid is used with the cutter wheel 10, the dished surfaces 18*a*, 18*b* of the cutter wheel 10 also increase the circulation of cooling fluid between the cutter wheel 10 and the structural member 50, thereby cooling the structural member 50 and the cutting wheel 10 and flushing debris from the space therebetween.

The side edges 34*a*, 34*b* of the cutter wheel 10 can also be urged axially against the workpiece to machine flat portions of the workpiece as well as concave and convex curved portions of the workpiece. When machining a flat surface, the cutter wheel 10 can be translated along the surface of the workpiece and also moved axially at a rate of, for example, 5% of the rate of translation, thus machining a surface angled at a 5% slope. When the blades 20 are used to machine a curved surface of the workpiece, the dished surfaces 18, 18*b* allow greater flexibility in the positioning of the cutter wheel 10 relative to the workpiece while avoiding inadvertent contact between the central portion 12 of the cutter wheel 10 and the workpiece. For example, FIG. 6 illustrates a structural member 50 formed with a cutter wheel 10 according to one embodiment of the present invention. For descriptive purposes, the structural member 50*a* is shown in a coordinate space defined by orthogonal X-, Y-, and Z-axes as shown. The structural member 50*a* has a base portion 52*a* and a plurality of T-stiffeners 54*a* extending therefrom. The base portion 52*a* extends generally in the directions of the X- and Z-axes and curves about the X-axis with a radius of curvature of about 10 feet in one embodiment. The T-stiffeners 54*a* extend in the Z-direction, tangential to the base portion 52*a*.

Figure 8:
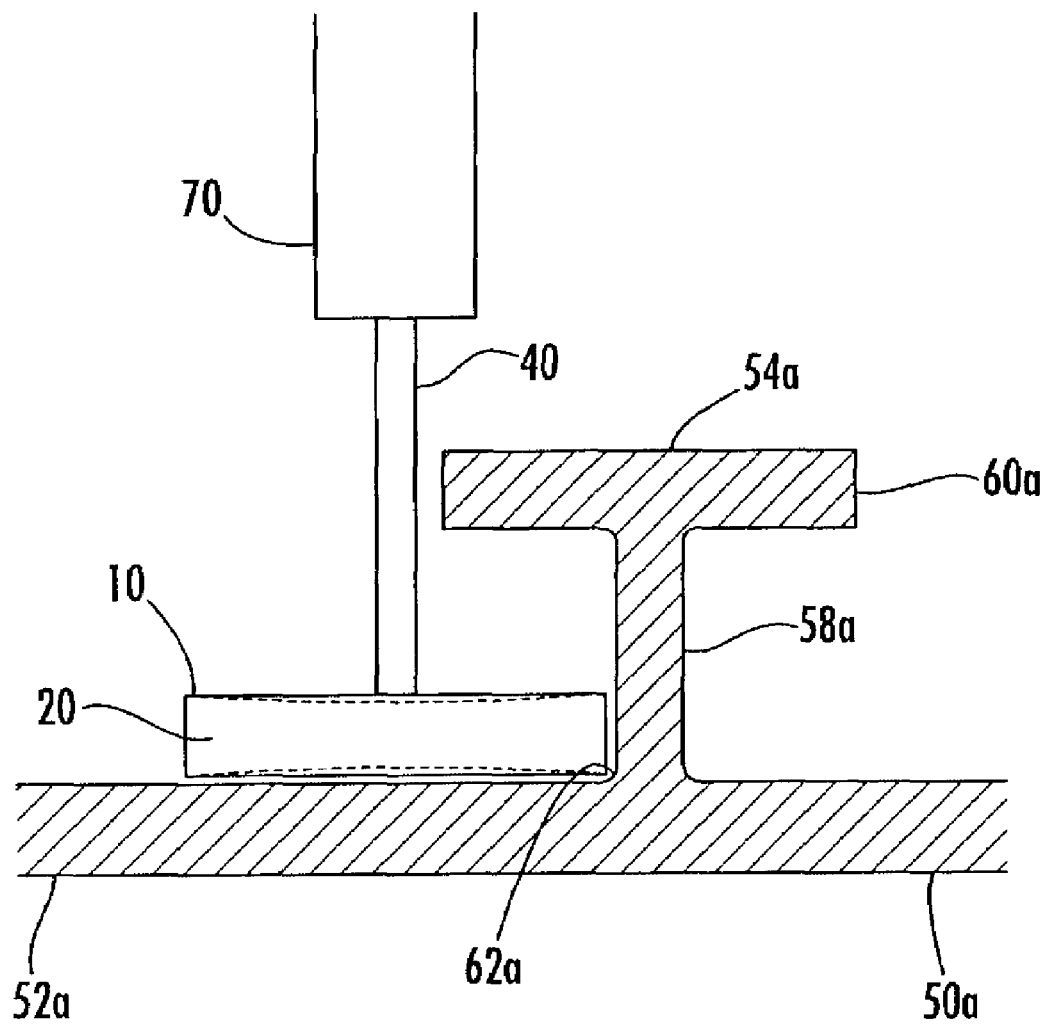
FIG. 8 is a section view of the structural member of FIG. 6 during manufacture as seen along line 8—8 in FIG. 7.

FIGS. 7 and 8 illustrate a portion of the structural member 50 of FIG. 6 during manufacture. Each of the T-stiffeners 54*a* includes a web 58*a* and a flange 60*a*. The T-stiffeners 54*a* are located proximate to one another such that a rotational device 70 used to rotate the cutter wheel 10 cannot be positioned between the T-stiffeners 54*a*. It is desirable to position the rotational device 70 near the T-stiffeners 54*a* so that the shaft 40 extends to the cutter wheel 10, which is positioned between proximate T-stiffeners 54*a*. The orientation of the rotational device 70 and, hence, the cutter wheel 10, is limited to avoid contact between the shaft 40 and the structural member 50*a*. Thus, assuming that an angled head such as a right-angle head is not used, the orientation of the cutter wheel 10 relative to the base portion 52*a* of the structural member 50*a* is limited. The top edges 32 of the blades 20 can be used to form most or all of the webs 58*a*, but at least some of the base portion 52*a* and the flanges 60*a* contact the side edges 34*a*, 34*b* of the blades 20 of the cutter wheel 10.

As shown in FIGS. 7 and 8, for example, the side edges 34*a* of the blades 20 are urged axially against the base portion 52*a* of the structural member 50*a* and the top edges 32 of the blades 20 are urged against the web 58*a*. While urged against the structural member 50*a*, the cutter wheel 10 is translated along the base portion 52*a* of the structural member 50*a* in a path that curves about the X-axis such that the cutter wheel 10 is kept normal to the structural member 50*b*. Thus, the cutter wheel 10 is moved in four axes, i.e., three axes of translation and rotation about the X-axis. As illustrated in FIG. 7, the central portion 12 of the cutter wheel 10 does not contact the base portion 52*b* of the structural member 50*b* as the cutter wheel is rotated against the base portion 52*b* of the structural member 50*b*. Instead, the dished surface 18*a* on the first side 14 of the cutter wheel 10 defines a space between the cutter wheel 10 and the structural member 50*b*. The cutter wheel 10 can also be used to machine a corner 62*a* between the web 58*a* and the base portion 52*a* as shown in FIG. 8. The corner 62*a* can define a radius depending on the shape of the blades 20.

Figure 10:
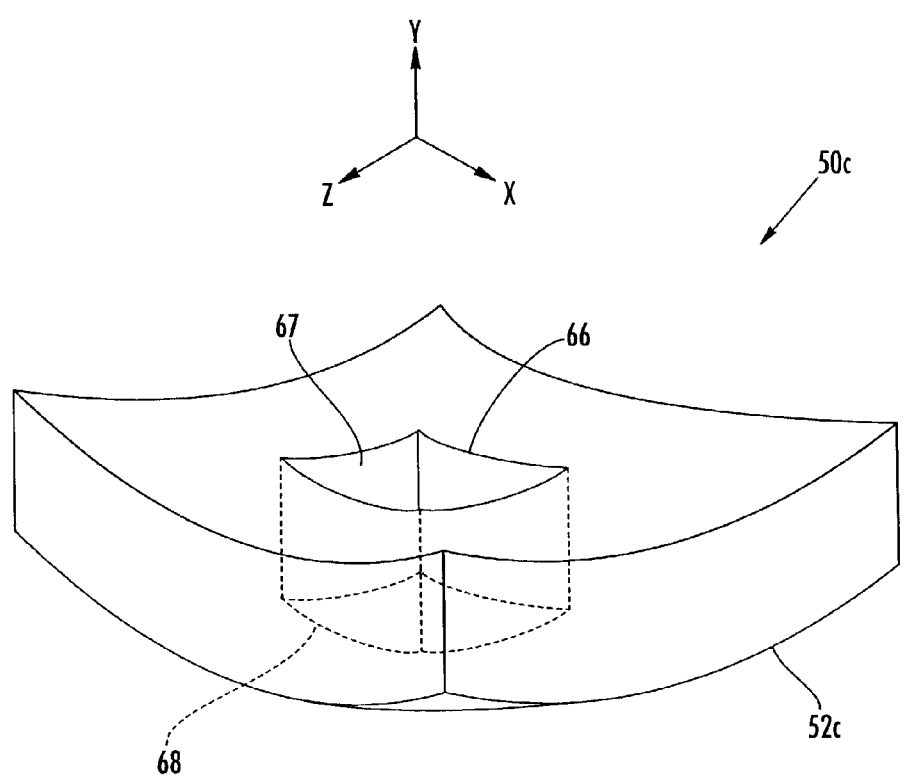
FIG. 10 is a perspective view of a structural member formed with a cutter wheel according to another embodiment of the present invention.

Various shapes can be machined using embodiments of the cutter wheel 10 of the present invention, including three-dimensional structural members that include portions that are curved about more than one axis. FIG. 9 illustrates a structural member 50*b* with a base portion 52*b* that curves about a X-axis and a Z-axis. A T-stiffener 54*b* extends from the base portion 52*b*, and a flange 60*b* of the T-stiffener 54*b* also curves about the X- and Z-axes. Similarly, return flanges 56 extend from the base portion 52*b* proximate to the T-stiffener 54*b*. Each of the surfaces of the base portion 52*b*, the T-stiffener 54*b*, and the return flanges 56 can be machined by urging the cutter wheel 10 against the surfaces as described above in connection with FIGS. 6–8. Because the structural member 50*b* curves about both the X- and Z-axes, the cutting wheel 10 is also rotated about both of those axes in addition to being translated in three dimensions while machining the structural member 50b. Thus, the cutter wheel is moved in five axes. Similarly, the cutter wheel 10 is translated in three dimensions and rotated about two axes to form a structural member 50c shown in FIG. 10. The structural member 50c has a base portion 52c that curves about X- and Z-axes and defines a pocket 66 with walls 67. Corner pockets 68 define the intersection between the walls 67. The cutter wheel 10 is used to machine the walls 67, the base portion 52c, and the corner pockets 67. Because the cutter wheel 10 can machine axially, the depth of the pocket 66 can be increased while machining the structural member 50c with the side edges 34a, 34b of the blades 20.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A rotatable cutting wheel comprising:
   a disk defining a first side, a second side opposite to said first side, and a plurality of radial blades, wherein at least one of said first and second sides defines a curved concave surface having an outermost periphery without a step,
   wherein the curved concave surface of the disk extends to and is continuous with the blades such that each blade defines an edge adjacent to the periphery of the concave surface.

2. The rotatable cutting wheel of claim 1 wherein said disk comprises carbide.

3. The rotatable cutting wheel of claim 2 wherein said disk comprises cemented carbide.

4. The rotatable cutting wheel of claim 3 wherein said disk comprises cemented carbide comprising tungsten carbide and cobalt binder.

5. The rotatable cutting wheel of claim 2 wherein said disk comprises at least one of the group consisting of titanium carbide, titanium carbonitride, tantalum carbide, niobium carbide, and chromium carbide.

6. The rotatable cutting wheel of claim 2 wherein said disk comprises carbide having a hardness of at least 84 Rockwell.

7. The rotatable cutting wheel of claim 1 wherein said disk comprises a coating comprising at least one of the group consisting of aluminum oxide, titanium nitride, titanium aluminum nitride, titanium carbonitride, zirconium nitride, and chromium.

8. The rotatable cutting wheel of claim 1 wherein said concave surface extends between a minimum axial dimension and a maximum axial dimension, said maximum axial dimension being at least 0.05 inches greater in an axial direction than said minimum axial dimension.

9. The rotatable cutting wheel of claim 1 wherein said concave surface extends between a minimum axial dimension and a maximum axial dimension, wherein said maximum axial dimension is defined by said plurality of blades.

10. The rotatable cutting wheel of claim 1 wherein said concave surface defines a smooth surface extending radially inward from said blades, such that a cross-sectional profile of said concave surface defines a smooth curve extending radially inward from said blades.

11. The rotatable cutting wheel of claim 1 wherein at least a part of said concave surface defines a spherically-curved contour.

12. The rotatable cutting wheel of claim 1 wherein each of said first and second sides defines a concave surface.

13. The rotatable cutting wheel of claim 1 wherein said disk and said blades comprise a unitary member.

14. The rotatable cutting wheel of claim 1 further comprising a shank extending from at least one of the first and second sides.

15. The rotatable cutting wheel of claim 14 wherein said shank and said disk comprise a unitary member.

16. The rotatable cutting wheel of claim 14 wherein said shank comprises carbide.

17. The rotatable cutting wheel of claim 1 wherein said disk defines a plurality of radially fluted lands between said blades.

18. The rotatable cutting wheel of claim 1 wherein each of said blades defines a leading side, a trailing side, and a relief side extending at least partially therebetween.

19. The rotatable cutting wheel of claim 1 wherein each of said blades extends radially from said disk and defines a cutting edge that extends radially and axially.

20. The rotatable cutting wheel of claim 19 wherein each of said blades defines a first side edge on said first side of said disk, a second side edge on said second side of said disk, and a top edge extending between said first and second side edges such that the cutting wheel is capable of machining a workpiece when the cutting wheel is rotated and one of the first and second sides of said disk is urged against the workpiece.

21. The rotatable cutting wheel of claim 1 wherein said disk further defines an alignment aperture located at a rotational center of said disk and extending only partially through the disk.

22. A rotatable cutting wheel comprising:
   a carbide disk defining a first side, a second side opposite to said first side, and a plurality of radial blades, wherein said disk and said blades comprise a unitary member and at least one of said first and second sides defines a smoothly curved, concave surface extending radially inward from a maximum axial dimension defined by said blades to a minimum axial dimension such that a cross-sectional profile of said concave surface defines a smooth nonlinear curve extending radially inward from said blade.

23. The rotatable cutting wheel of claim 22 wherein said maximum axial dimension is at least 0.05 inches greater in an axial direction than said minimum axial dimension.

24. The rotatable cutting wheel of claim 22 wherein at least a part of said smooth, concave surface defines a spherically-curved contour.

25. The rotatable cutting wheel of claim 22 wherein each of said first and second sides defines a smooth, concave surface.

26. The rotatable cutting wheel of claim 22 further comprising a shank extending from at least one of the first and second sides.

27. The rotatable cutting wheel of claim 26 wherein said shank and said disk comprise a unitary carbide member.

28. The rotatable cutting wheel of claim 22 wherein said disk defines a plurality of radially fluted lands between said blades.

29. The rotatable cutting wheel of claim 22 wherein each of said blades defines a leading side, a trailing side, and a relief side extending at least partially therebetween.

30. The rotatable cutting wheel of claim 22 wherein each of said blades extends radially from said disk and defines a cutting edge that extends radially and axially.

31. The rotatable cutting wheel of claim 30 wherein each of said blades defines a first side edge on said first side of said disk, a second side edge on said second side of said disk, and a top edge extending between said first and second side edges such that the cutting wheel is capable of machining a workpiece when the cutting wheel is rotated and one of the first and second sides of said disk is urged against the workpiece.

32. The rotatable cutting wheel of claim 22 wherein said disk further defines an alignment aperture located at a rotational center of said disk.

33. The rotatable cutting wheel of claim 22 wherein said disk comprises cemented carbide.

34. The rotatable cutting wheel of claim 22 wherein said disk comprises cemented carbide comprising tungsten carbide and cobalt binder.

35. The rotatable cutting wheel of claim 22 wherein said disk comprises at least one of the group consisting of titanium carbide, titanium carbonitride, tantalum carbide, niobium carbide, and chromium carbide.

36. The rotatable cutting wheel of claim 22 wherein said disk comprises carbide having a hardness of at least 84 Rockwell.

37. The rotatable cutting wheel of claim 22 wherein said disk comprises a coating comprising at least one of the group consisting of aluminum oxide, titanium nitride, titanium aluminum nitride, titanium carbonitride, zirconium nitride, and chromium.

* * * * *